(12) United States Patent
Partanen et al.

(10) Patent No.: US 8,630,797 B2
(45) Date of Patent: Jan. 14, 2014

(54) METHOD AND DEVICE FOR GUIDING A PERSON TO A DESTINATION

(75) Inventors: Lotta Maaria Partanen, Espoo (FI); Menno Dieperink, Eindhoven (NL); Job Rutgers, Toronto (CA); Catharine Melissa Macintosh, Toronto (CA); Richard Allan Thomas, Toronto (CA)

(73) Assignee: Koninklijke Philips N.V., Eindhoven (NL)

( * ) Notice: Subject to any disclaimer, the term of this patent is extended or adjusted under 35 U.S.C. 154(b) by 613 days.

(21) Appl. No.: 12/599,367

(22) PCT Filed: May 8, 2008

(86) PCT No.: PCT/IB2008/051809
§ 371 (c)(1),
(2), (4) Date: Mar. 11, 2011

(87) PCT Pub. No.: WO2008/139385
PCT Pub. Date: Nov. 20, 2008

(65) Prior Publication Data
US 2011/0160997 A1    Jun. 30, 2011

(30) Foreign Application Priority Data

May 11, 2007 (EP) .................................... 07108046

(51) Int. Cl.
*G01C 21/00* (2006.01)
(52) U.S. Cl.
USPC ........................................ 701/408; 709/207
(58) Field of Classification Search
USPC ............ 701/408, 400; 709/207, 238; 345/157
See application file for complete search history.

(56) References Cited

U.S. PATENT DOCUMENTS 6,473,704 B1    10/2002    Ito et al.

FOREIGN PATENT DOCUMENTS

| EP | 1669722 A1 | 6/2006 |
|---|---|---|
| EP | 1847954 A1 | 10/2007 |
| JP | 2000149150 | 5/2000 |
| JP | 2002009422 A | 1/2002 |
| JP | 2003216765 | 7/2003 |
| JP | 2003344215 A | 12/2003 |
| JP | 2005106769 | 4/2005 |
| JP | 2006125942 A | 5/2006 |
| WO | 2006015399 A1 | 2/2006 |
| WO | 2006092945 A1 | 9/2006 |

OTHER PUBLICATIONS

Jones et al: "Navigation-By-Music for Pedestrians: An Initial Prototype and Evaluation"; Fit Lab, Computer Science Dept., University of Wales, Swansea, UK and Dept. of Computer Science, University of Waikato, NZ, 7 Page Document, 2006.

*Primary Examiner* — Thomas Black
*Assistant Examiner* — Luke Huynh

(57) ABSTRACT

A method, device, and computer-readable medium are configured for guiding a person (21) to a destination. The method comprises the steps of storing an association between a person (21) and a content item, wherein the content item comprises audio and/or at least one image, determining a destination for the person (21), determining a current position of the person (21), identifying at least one reproduction device (22, 23, 24, 25) between the current position and the destination, and reproducing the content item on the identified at least one reproduction device (22, 23, 24, 25).

9 Claims, 2 Drawing Sheets

METHOD AND DEVICE FOR GUIDING A PERSON TO A DESTINATION

FIELD OF THE INVENTION

The invention relates to a method of guiding a person to a destination.

The invention also relates to a device for guiding a person to a destination.

The invention further relates to a computer program product enabling a programmable device to perform a method of guiding a person to a destination.

BACKGROUND OF THE INVENTION

An example of such a method is known from JP-200149150. JP-200149150 discloses a guidance system guiding a worker/visitor in a hospital wherein the user is guided to the destination by lighting the path of his travel. When the user is blind, the name and the course of a patient can be simultaneously outputted by a voice of a speaker. The known method is capable of identifying a user for which certain direction info is meant by displaying an alphabetic character.

It is a drawback of the known method that showing or reading out a person's name could raise privacy concerns while, on the other hand, a person might have difficulty remembering a number assigned to him.

SUMMARY OF THE INVENTION

It is a first object of the invention to provide a method of guiding a person to a destination, which does not require a user to remember an assigned number while limiting privacy concerns.

It is a second object of the invention to provide a device for guiding a person to a destination, which does not require a user to remember an assigned number while limiting privacy concerns.

According to the invention, the first object is realized in that the method of guiding a person to a destination comprises the steps of storing an association between a person and a content item, the content item comprising audio and/or at least one image, determining a destination for the person, determining a current position of the person, identifying at least one reproduction device between the current position and the destination, and reproducing the content item on the identified at least one reproduction device. By displaying a personalized image, e.g. the image of a person's pet, or sequence of images and/or reproducing a personalized audio fragment, e.g. a certain bird sound, in the guiding method, a person can easily recognize the direction that is meant for him, while his identity does not need to be revealed. The guiding method can be used in a hotel, restaurant or hospital, for example. In a hotel, the destination may be, for example, a guest's own hotel room, the restaurant, or the gym. The person may be a group of persons who need to be guided to the same destination.

In an embodiment of the method, the step of identifying at least one device comprises identifying a device in the vicinity of the current position of the person in the direction of the destination. This has the advantage of saving power consumption and makes it easier for a person to focus on own content items.

The current position may be a fixed position. For example, the reception desk of a hotel, hospital or restaurant may be used as the current position.

Alternatively, the current position may be determined by tracking features (e.g. facial features or features of clothing) in images captured by a plurality of cameras. As another alternative, wireless technology may be used to determine the current position, for example by using triangulation.

The method may further comprise the step of allowing the person to select the content item. The person may, for example, select an image of his pet or of an object in his home. A content item selected by the person himself is usually very recognizable. The same content item can be used in multiple hotels, hospitals or restaurants. For example, these hotels, hospitals or restaurants may share the personalized image(s) and/or audio with each other. The person may be allowed to select or upload the content item when he books a room online The method may further comprise the step of selecting the content item based on stored personal details and/or preferences of the person. This has the advantage of requiring less user interaction, although an automatically selected content item is usually less recognizable than a content item selected by the user himself The automatically selected content item may be, for example, a photo of an object near the home of the person, e.g. retrieved from a virtual globe, map and geographical information program GOOGLE EARTH™. The person may be allowed to enter his personal details and/or preferences when he books a room online.

According to the invention, the second object is realized in that the electronic circuitry of the device for guiding a person to a destination is operative to store an association between a person and a content item, the content item comprising audio and/or at least one image, determine a destination for the person, determine a current position of the person, identify at least one reproduction device between the current position and the destination, and reproduce the content item on the identified at least one reproduction device.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
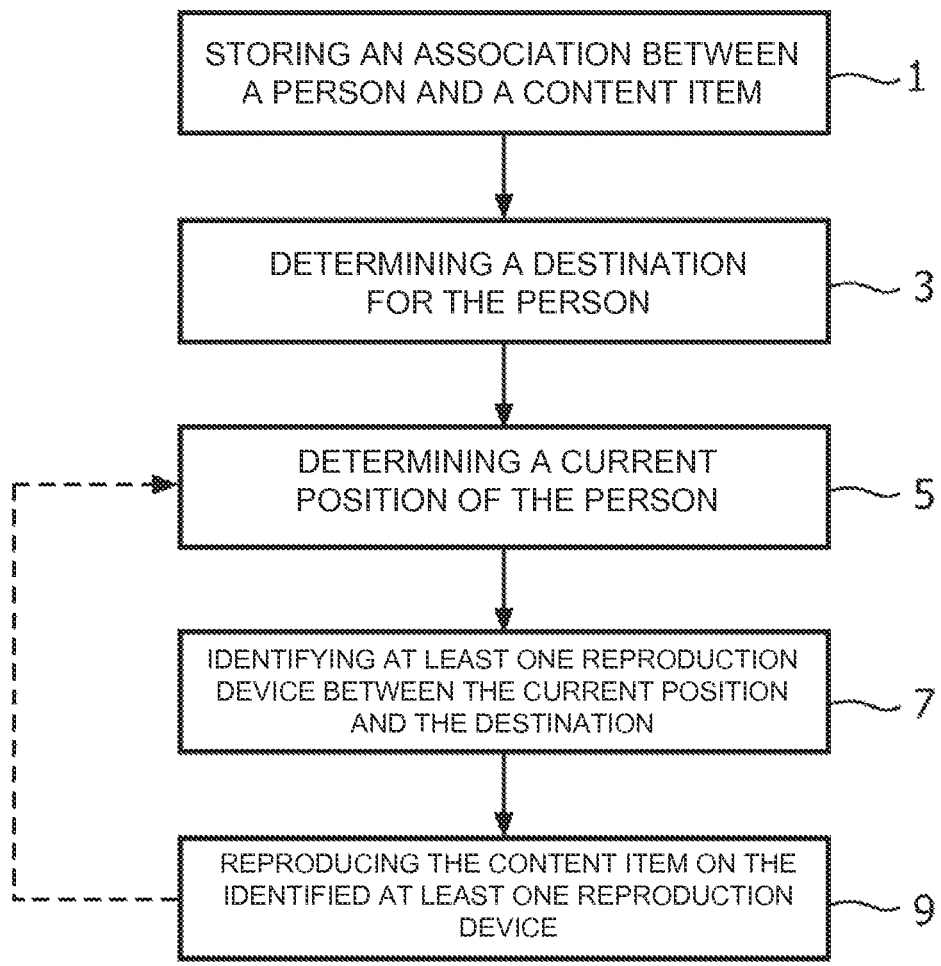
FIG. 1 is a flow chart of the method of the invention.

The method of guiding a person to a destination comprises five steps, see FIG. 1. A step 1 comprises storing an association between a person and a content item, the content item comprising audio and/or at least one image. A step 3 comprises determining a destination for the person. A step 5 comprises determining a current position of the person. A step 7 comprises identifying at least one reproduction device between the current position and the destination. A step 9 comprises reproducing the content item on the identified at least one reproduction device.

Figure 2:
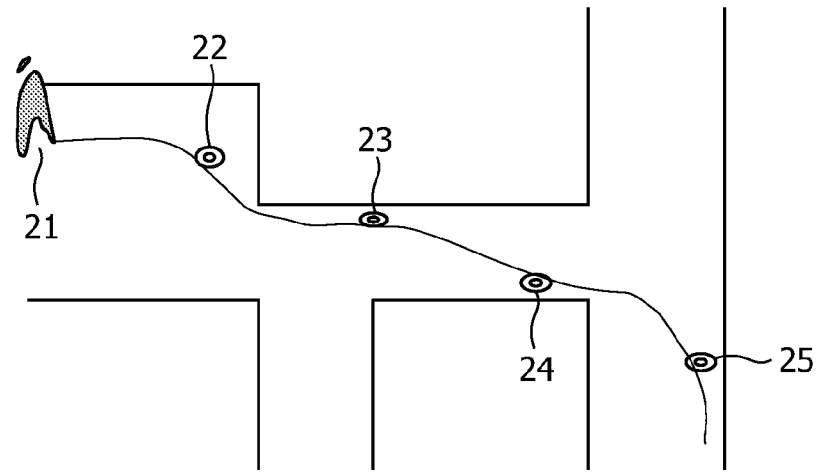
FIG. 2 is a schematic overview of part of an embodiment of the system of the invention.

FIG. 2 shows a route taken by a person 21 in a section of a building. On this route, four reproduction devices 22 to 25 reproduce the content item in order to guide the person 21 to his destination. In this embodiment, the person 21 wears an RFID token, e.g. a mobile phone, and as soon as the person 21 comes close enough to a reproduction device, the content item is reproduced on the next reproduction device. For example, when the person 21 comes close enough to reproduction device 25 which is reproducing the content item, the reproduction device 24 also starts reproducing the content item. The reproduction device 25 stops reproducing the content item as soon as reproduction device 24 has started reproducing the content item. The reproduction devices 22 to 25 may be, for example, speakers or televisions. If the reproduction devices 22 to 25 are televisions, they may be capable of allowing the person 21 to browse information, e.g. information of attractions in the vicinity of the hotel.

Figure 3:
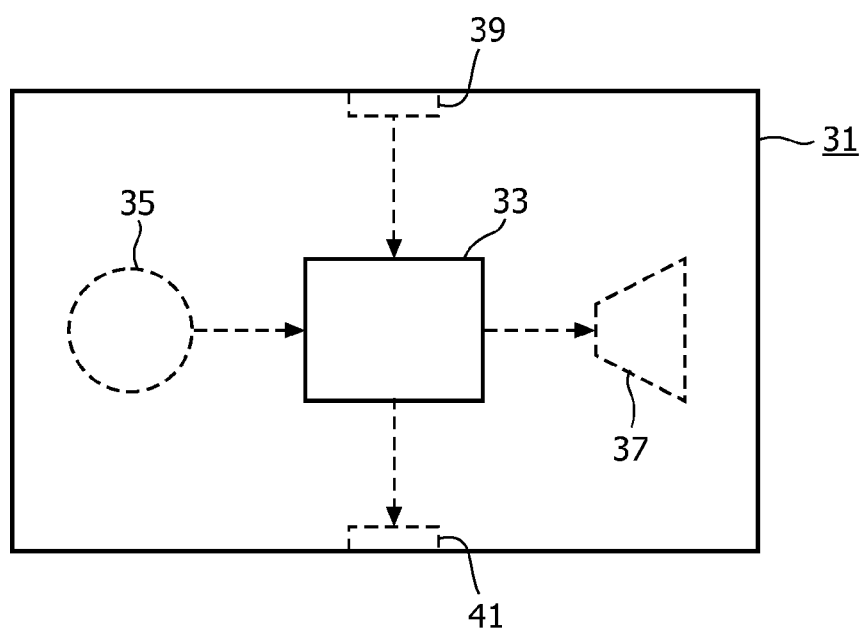
FIG. 3 is a block diagram of the device of the invention.

FIG. 3 shows the electronic device 31 of the invention. The electronic device 31 comprises electronic circuitry 33. The electronic circuitry is operative to store an association between a person and a content item, the content item comprising audio and/or at least one image, determine a destination for the person, determine a current position of the person, identify at least one reproduction device between the current position and the destination, and reproduce the content item on the identified at least one reproduction device.

The electronic device 31 may further comprise a storage means 35, a reproduction means 37, an input 39 and/or an output 41. The electronic circuitry 33 may be, for example, a general-purpose or an application-specific processor. The electronic circuitry 33 may be capable of executing a computer program. The storage means 35 may comprise, for example, a hard disk, solid-state memory, an optical disc reader or a holographic storage means. The reproduction means 37 may comprise, for example, a display and/or a loud speaker. The input 39 and output 41 may comprise, for example, a network connector, e.g. a USB connecter or an Ethernet connector, an analog audio and/or video connector, such as a cinch connector or a SCART connector, or a digital audio and/or video connector, such as an HDMI or SPDIF connector. The input 39 and output 41 may comprise a wireless receiver and/or transmitter.

The reproduction means 37 may be used to reproduce the content item at the reception desk, so that the customer knows what content item will be used to guide him. Alternatively, the content item may be reproduced on an external reproduction means using output 41. Input 39 may be used to allow the customer to select a content item. Output 41 may be used to control the reproduction devices. The storage means 35 may be used to store the association between the customer and the content item and optionally the content item itself Inputs 39 and 41 may be used to exchange associations and/or content items with other devices, e.g. devices used in other hotels of the same chain.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method of guiding a person to a destination, comprising the steps of:
    storing an association between a person and a personalized content item, wherein the personalized content item is easily recognizable to the person while not revealing the person's identity and comprises one selected from the group consisting of (i) audio, (ii) at least one image, and (iii) audio and at least one image;
    determining a destination for the person;
    determining a current position of the person;
    identifying at least one reproduction device along a route between the current position and the destination; and
    reproducing the personalized content item on the identified at least one reproduction device as the person travels along the route from the current position in a direction of the destination, wherein the personalized content item is reproduced on a first reproduction device in the direction of the destination and, responsive to the person coming close enough to the first reproduction device which is reproducing the personalized content item, the personalized content item is reproduced on a next reproduction device in the direction of the destination, wherein reproduction of the personalized content item on the first reproduction device is stopped as soon as reproduction of the personalized content item on the next reproduction device has started.

2. The method as claimed in claim 1, wherein the step of identifying at least one reproduction device comprises identifying a reproduction device in a vicinity of he current position of the person in the direction of the destination.

3. The method as claimed in claim 1, wherein the current position is a fixed position.

4. The method as claimed in claim 1, wherein the current position is determined by tracking features in images captured by a plurality of cameras.

5. The method as claimed in claim 1, further comprising the step of allowing the person to select the personalized content item.

6. The method as claimed in claim 1, further comprising the step of selecting the personalized content item based on one selected from the group consisting of (i) stored personal details, (ii) preferences of the person, and (iii) stored personal details and preferences of the person.

7. A non-transitory computer-readable medium embodied with a computer program for enabling a programmable device to perform the method of claim 1.

8. A device for guiding a person to a destination, comprising electronic circuitry, the electronic circuitry being operative to:
    store an association between a person and a personalized content item, wherein the personalized content item is easily recognizable to the person while not revealing the person's identity and comprises one selected from the group consisting of (i)audio, (ii) at least one image, and (iii) audio and at least one image;
    determine a destination for the person;
    determine a current position of the person;
    identify at least one reproduction device along a route between the current position and the destination; and reproduce the personalized content item on the identified at least one reproduction device as the person travels along the route from the current position in a direction of the destination, wherein the personalized content item is reproduced on a first reproduction device in the direction of the destination and, responsive to the person coming close enough to the first reproduction device which is reproducing the personalized content item, the personalized content item is reproduced on a next reproduction device in the direction of the destination, wherein reproduction of the personalized content item on the first reproduction device is stopped as soon as reproduction of the personalized content item on the next reproduction device has started.

9. A system comprising the device of claim 8 and a plurality of reproduction devices.

* * * * *